United States Patent
Hu et al.

(10) Patent No.: US 9,056,729 B2
(45) Date of Patent: Jun. 16, 2015

(54) SLAT CONVEYOR

(75) Inventors: Benson Hu, Shanghai (CN); Markus Florentzson, Staffanstorp (SE); Andreas Asper, Shanghai (CN)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 48 days.

(21) Appl. No.: 13/515,029

(22) PCT Filed: Nov. 23, 2010

(86) PCT No.: PCT/SE2010/051288
§ 371 (c)(1),
(2), (4) Date: Aug. 7, 2012

(87) PCT Pub. No.: WO2011/071437
PCT Pub. Date: Jun. 16, 2011

(65) Prior Publication Data
US 2012/0298482 A1  Nov. 29, 2012

(30) Foreign Application Priority Data
Dec. 11, 2009  (SE) ........................ 0901548

(51) Int. Cl.
*B65G 47/52* (2006.01)
*B65G 47/53* (2006.01)
*B65G 47/84* (2006.01)

(52) U.S. Cl.
CPC ................................... *B65G 47/844* (2013.01)

(58) Field of Classification Search
None
See application file for complete search history.

(56) References Cited

U.S. PATENT DOCUMENTS

| 3,009,572 | A | * | 11/1961 | Seaborn | 198/890.1 |
| 3,277,995 | A | | 10/1966 | Seed | |
| 3,780,850 | A | | 12/1973 | McSwiggin | |
| 3,938,647 | A | | 2/1976 | Raque | |
| 3,986,596 | A | * | 10/1976 | Hamilton | 198/890.1 |
| 4,984,675 | A | * | 1/1991 | Yamabe et al. | 198/890.1 |
| 5,323,912 | A | | 6/1994 | Fan et al. | |
| 5,657,858 | A | | 8/1997 | Van Den Goor | |
| 6,419,073 | B1 | * | 7/2002 | Piron | 198/370.03 |
| 7,086,519 | B2 | * | 8/2006 | Veit et al. | 198/370.02 |
| 2002/0096417 | A1 | | 7/2002 | Veit et al. | |

FOREIGN PATENT DOCUMENTS

CN  1575255 A  2/2005
GB  923689  4/1963

OTHER PUBLICATIONS

International-Type Search Report (PCT/ISA/201/SE) issued on May 27, 2010, by the Swedish Patent Office in Swedish Application No. 0901548-8 and English translation of International-Type Search Report.

(Continued)

*Primary Examiner* — Kavel Singh
(74) *Attorney, Agent, or Firm* — Buchanan Ingersoll & Rooney PC

(57) ABSTRACT

A carrying segment comprises a first surface for receiving objects, a second surface, and at least a third and a fourth surface connecting said first surface and said second surface, a first engaging member arranged on said second surface and configured to be guided by a first guide of a slat conveyor, and a second engaging member arranged on said second surface on one side of the first engaging member and configured to be guided by a first switch of said slat conveyor.

12 Claims, 2 Drawing Sheets

(56) References Cited

OTHER PUBLICATIONS

International Preliminary Report on Patentability and Written Opinion (PCT/IB/373) issued on Jun. 12, 2012, by the Swedish Patent Office in Application No. PCT/SE2010/051288.

International Search Report (PCT/ISA/210) issued on Mar. 9, 2011, by the Swedish Patent Office as the International Searching Authority for International Application No. PCT/SE2010/051288.

Office Action issued on Feb. 8, 2014, by the Chinese Patent Office in corresponding Chinese Patent Application No. 201080055872.8, and an English Translation of the Office Action. (9 pages).

* cited by examiner

SLAT CONVEYOR

TECHNICAL FIELD

The present invention relates to a slat conveyor. More particular, the present invention relates to a slat conveyor being configured to split a single conveying route into at least two conveying routes having different directions.

BACKGROUND

Slat conveyors are used in several applications, for transporting goods or objects along a predefined path. More particularly, slat conveyors may be implemented to divide a single transporting route into two different transporting routes. This functionality may e.g. be valuable if the slat conveyor is connected to a production line, where products should be transported to different target destinations, such as packaging stations. In other situations, the production line may deliver products at a speed which must be decreased for allowing efficient handling. Thus, a slat conveyor may be used to divide the line of products into two corresponding lines, which means that two handling stations would be allowed to operate at half the speed of the production.

Such systems, which are currently on the market, uses an endless driving mechanism to drive a conveying surface having slats, or ribs, arranged transverse of the conveying direction. A number of carriers are arranged on the slats and are guided along the slats by a guide located beneath the slats. Hence, when the slats are moving forwards, the carriers will also move forwards by means of the slats, while they also are urged to move laterally by the guide. Hence, a switch is required to direct the carriers in any direction away from the center of the slat conveyor.

While available systems may be used for different applications, a number of drawbacks become present when the speed of the slat conveyor is increased. For example, in a typical production line for beverage containers, the filling equipment will deliver products at a speed up to 19000 packages per hour. This requires a typical speed of the slat conveyor of approximately 1 m/s. Further, a high resolution of the slat conveyor is desired for allowing the packages to rest securely on the carriers. That is, a package should occupy a number of carriers for eliminating the risk of having the package to fall off the carrier. For example, a carrier width of 3 cm may be used for transporting a package being approximately 9 cm long. Thus, three carriers are occupied by each package, and one carrier will always be carrying only one package.

The switch is therefore required to have the ability to switch approximately every 30 ms, with a very fast response time. If the switch operates too fast, it is not desired to switch when a carrier is moving within the switch. If so, the carrier will be exposed to an excessive force leading to increased wear and weakness of the system. Therefore, the switch must be substantially shorter than the width of the carrier. When the dimensions of the switch is made smaller, the system will consequently suffer from great complexity and small tolerances, leading to increased manufacturing costs and decreased operational stability.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a system according to the appended patent claims.

An idea of the invention is to provide a slat conveyor enabling a single conveying route to be divided into two different conveying routes at a high speed, having a high resolution and still providing robustness of the slat conveyor.

According to an aspect of the invention, a carrying segment is provided. The carrying segment comprises a first surface for receiving objects, a second surface, and at least a third and a fourth surface connecting said first surface and said second surface, a first engaging member arranged on said second surface and configured to be guided by a first guiding means of a slat conveyor, and a second engaging member arranged on said second surface on one side of the first engaging member and configured to be guided by a first switch of said slat conveyor.

The first engaging member and the second engaging member may be arranged symmetrically such that, if the carrying segment is rotated 180° horizontally, the second engaging member is configured to be guided by a second switch of said slat conveyor. This is advantageous in that all segments may be manufactured by the same production equipment, thus reducing the cost.

The first engaging member may be a protrusion, and the second engaging member may be a protrusion. The protrusions may thus be guided by a groove, which is a reliable and cost-effective way of guiding improving the robustness of the carrying segment.

According to a second aspect, a slat conveyor is provided. The slat conveyor comprises a first guiding means arranged to guide a plurality of carrying segment according to the first aspect from a single conveying route, via a switching area, to at least two different conveying routes along a conveying surface of the slat conveyor, and a second guiding means comprising at least two individually controlled switches arranged on opposite sides of the switching area. The first switch is arranged to guide the second engaging member of a segment arranged on a first side of the first engaging member, and the second switch is arranged to guide a second engaging member of a subsequent segment arranged on an opposite side of the first engaging member.

The switches may be controlled by electromagnetic actuators or by pneumatic cylinders, which is advantageous in that a fast response time is achieved.

The slat conveyor may further comprise a sensor for detecting the presence and/or absence of an object, wherein the sensor is connected to the switches by means of a control means. Hence, the slat conveyor may be used in systems where objects are transported in a non-continuous manner, thus providing an on-demand directing of objects.

The slat conveyor may further comprise means for detecting the location of the second engaging member of a particular carrying segment, wherein the slats are alternately staggered in their longitudinal direction and wherein said means further comprises a sensor for detecting the projecting ends of the slats. This is advantageous that switching never occurs if an engaging member is currently located in a switch. Hence, increased robustness of the slat conveyor is achieved.

The slat conveyor may further comprise a control means for moving the switches, wherein a first switch is moved when it receives a signal from the control means, and wherein the second switch is automatically moved after a predetermined time. Preferably, the predetermined time is calculated from the speed of the slat conveyor. This is advantageous in that the two switches are synchronized in a reliable manner, which further increases the robustness of the slat conveyor.

BRIEF DESCRIPTION OF DRAWINGS

These and other aspects, features and advantages of which the invention is capable of will be apparent and elucidated from the following description of embodiments of the present invention, reference being made to the accompanying drawings, in which.

DETAILED DESCRIPTION

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on an embodiment of the present invention applicable to a slat conveyor dividing a single conveying route into two different conveying routes.

Figure 1:
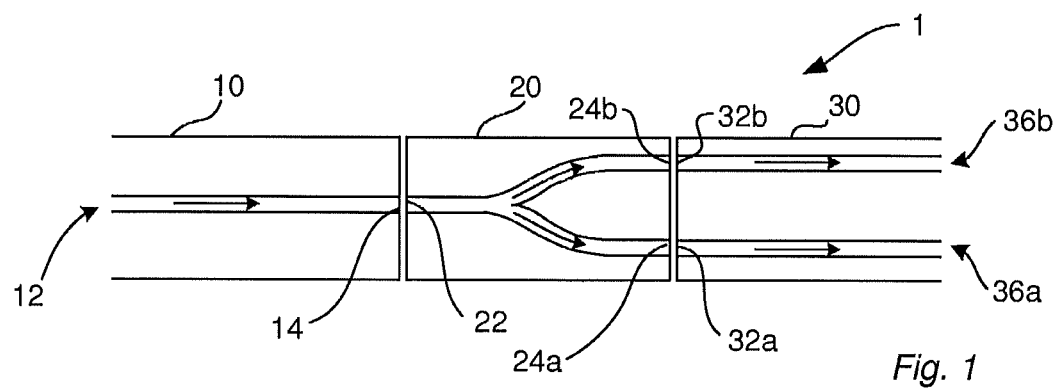
FIG. 1 is an illustration showing a production line having a slat conveyor.

With reference to FIG. 1, a system 1 is shown. The system comprises a first conveyor 10, having an inlet 12 of transported objects at a first end and an outlet 14 of transported objects at a second end. The objects are thus transported from the inlet 12 to the outlet 14 by means of the conveyor 10, which may be of any suitable conveyor known per se. The outlet 14 of said conveyor 10 is arranged adjacent to an inlet 22 of a slat conveyor 20, which receives transported objects and transport these towards any of two different outlets 24a, 24b of the slat conveyor 20. The slat conveyor 20 is thus directing a single line of moving objects into two different lines. A second conveyor 30 is arranged adjacent to the outlets 24a, 24b of the slat conveyor 20, to continue transporting objects away from the slat conveyor 20. The second conveyor 30 receives objects at inlets 32a, 32b, and carries the objects along two different tracks 36a, 36b towards a target destination (not shown).

Figure 2:
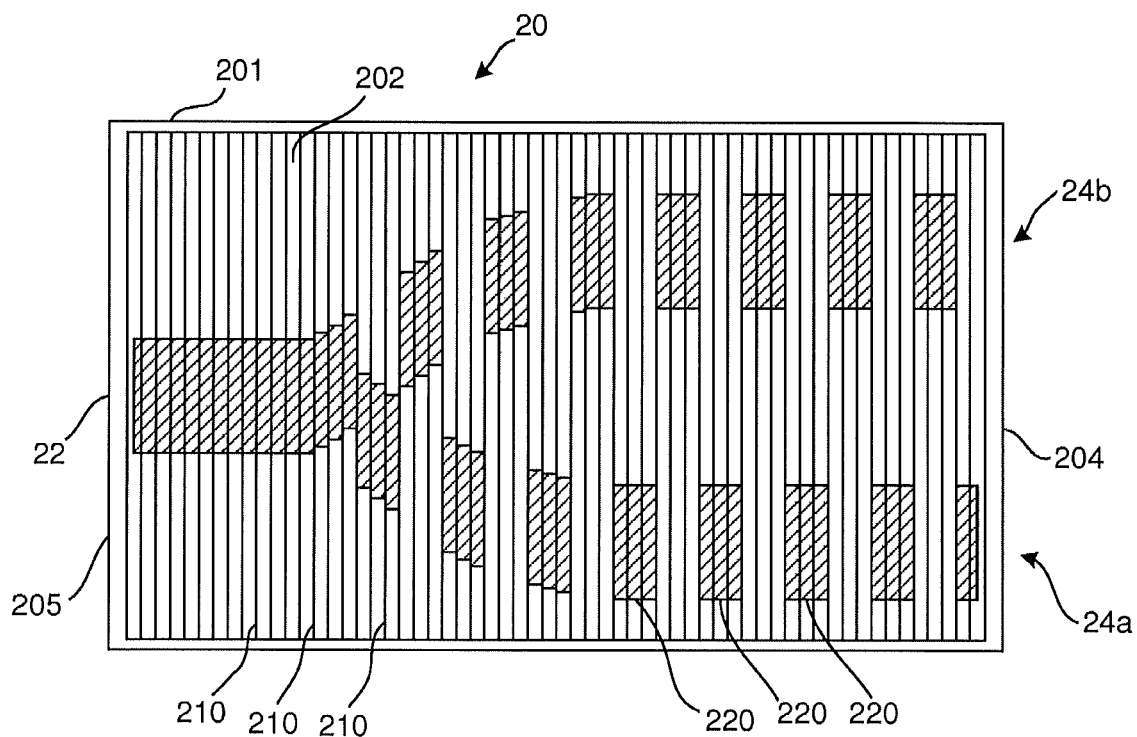
FIG. 2 is a top view of a slat conveyor according to an embodiment.

The slat conveyor 20 is shown in further detail in FIG. 2. A rectangular frame 201 is defining an upper surface 202, a lower surface (not shown), and two end surfaces 204, 205. A driving mechanism (not shown) is connected to two opposite sides of the frame 201 and slats 210 are fixedly attached to the driving mechanism such that the slats 210 extend transversally across the upper surface 201, the lower surface, and the two end surfaces 204, 205 of the frame 201. The driving mechanism may e.g. be two endless belts, or two chains, driven by an electric motor. Hence, the driving mechanism is configured to continuously move the slats 210 along the upper surface 202, along an end surface 205, in a reversed direction along the lower surface, and back to the upper surface 202 via the second end surface 205.

Further, the slat conveyor 20 has a plurality of carrying segments 220. Each carrying segment 220 is arranged in the space between two adjacent slats 210, and has a transverse extension that is substantially less than the length of the slats 210. Each carrying segment 220 is further moveable in a transverse direction along the slats 210 by sliding. In an embodiment, the carrying segments 220 are resting on the slats 210 such that any object lying on a carrying segment 220 will not be in contact with the slats 210. Moreover, the carrying segments 220 are attached to the slats 210 such that the carrying segments 220 will not fall off the slat conveyor 20 when they are moving along the lower surface of the frame 201. The carrying segments 220 may have friction enhancing means on the upper surface for preventing objects to slide off the carrying segments 220. For example, such means may include grip tape, groove patterns, etc.

The width of the carrying segments 220 is preferably made small, for reducing the risk that a transported object may fall off the carrying segments 220 during switching direction.

Figure 3:
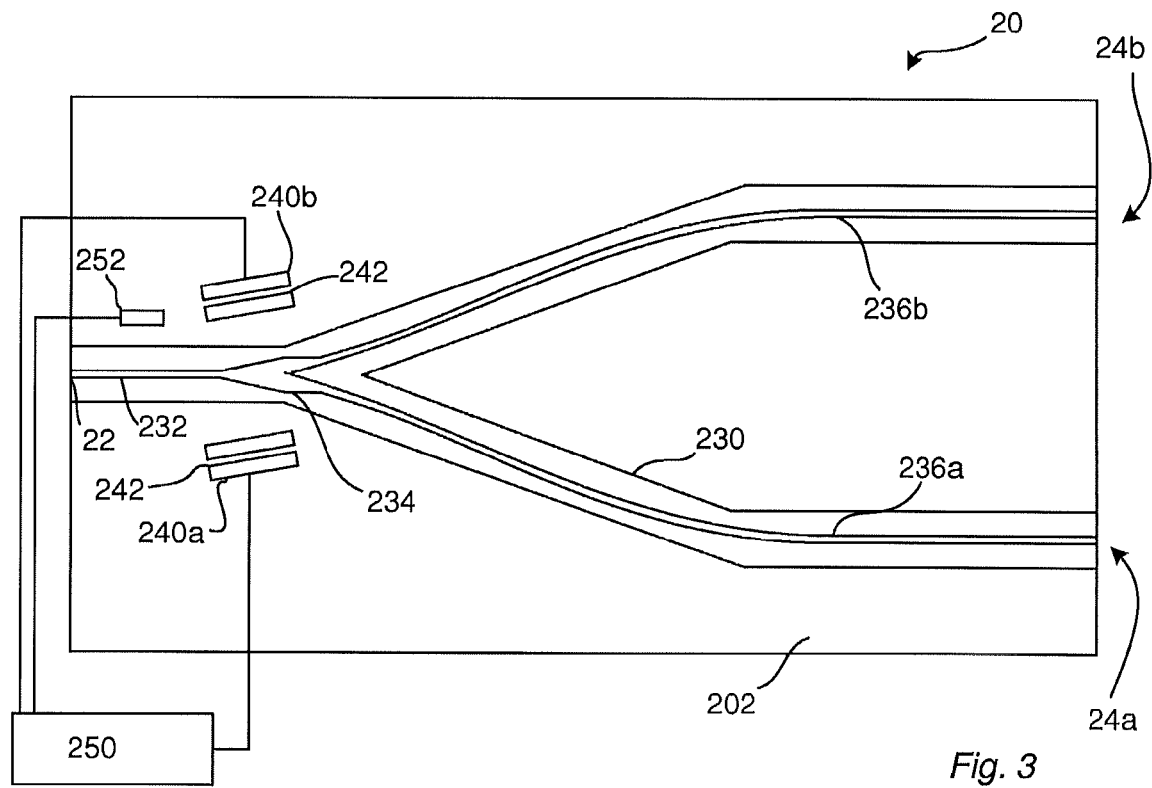
FIG. 3 is an illustration showing a cross section of a slat conveyor according to an embodiment.
Figure 4:
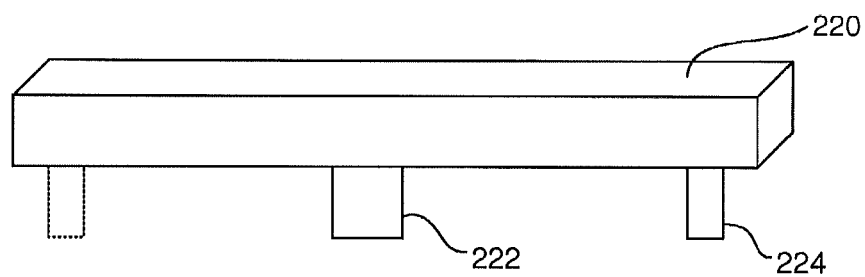
FIG. 4 is a perspective view of a carrying segment for use with a slat conveyor according to an embodiment.

Reference is now made to FIGS. 3 and 4, showing a cross section of the slat conveyor 20 and a side view of a carrying segment 220. The frame 201 comprises a guiding path 230, for guiding the carrying segments 220 along the upper surface 202. The guiding path 230 extends from the inlet 22 to the outlets 24a, 24b of the slat conveyor 20 and is arranged at a position beneath the slats 210 such that the slats 210 are moving above the guiding path 230. This is shown in FIG. 3, in which the slats 210 have been excluded for illustrative purposes only. Further, the guiding path 230 has a groove 232, adopted to receive a first protrusion 222 in the form of a pin of a carrying segment 220. The groove 232 extends from the inlet 22 towards the centre of the upper surface 202 of the frame 201. The groove 232 has a central portion 234, acting as a switching area, which divides into two branches 236a, 236b. Each of the two branches 236a, 236b is extending from the central portion 234 of the groove 232 to the outlets 24a, 24b of the slat conveyor 20. The central portion 234 of the groove 232 is somewhat wider than the rest of the groove 232, for allowing a transverse displacement of a carrying segment 220.

In another embodiment, the guiding path 230 may have a protrusive track, and the engaging means 222 of the carrying segment 220 may be a complementary recess.

With further reference to FIG. 3, the slat conveyor 20 has two switches 240a, 240b arranged on opposite sides of the guiding path 230. The switches 240a, 240b are located on each side of the central portion 234 of the groove 232. Each switch 240a, 240b has a groove 242 extending along the switch. The groove 242 is configured to guide a carrying segment 220 by means of a second protrusion 224, in the form of a pin, arranged at a distance from the first protrusion 222 on the lower side of the carrying segment 220.

The second protrusion 224 is arranged on the second surface of the carrying segment 220 on one side of the first protrusion 222 and configured to be guided by a switch 240a, 240b of the slat conveyor 20. On the opposite side of the first protrusion 222, in a position corresponding to the position of the second protrusion 224 on the one side of the first protrusion 222, the carrying segment 220 lacks a second protrusion 224, i.e. a void is provided. Thus, the carrying segment 220 can be asymmetric around a vertical plane through the centre of the first protrusion 222 in the direction of the intended movement of the carrying segment 220. However, the distance between the first and the second protrusion may remain constant in different carrying segments 220, such that a 180 degrees rotation around a vertical axis, will position the second protrusion 224 on the same distance from the first protrusion 222 but on the opposite side. In this way the second protrusion 224 may cooperate with the switches 240a, 240b, by rotating the carrying segment 220 180 degrees around a vertical axis. Thus only one switch 240a, 240b will communicate with the second protrusion 224 during each passage of the carrying segment 220 through the zone of the switches 240a, 240b, or at least one of the switches 240a, 240b will not communicate with the second protrusion 224 during such passage.

Hence, each one of the carrying segments 220 is provided with the second protrusion 224 on one side of the lower surface. For subsequently arranged carrying segments 220, the position of the second protrusion 224 is altered such that a first carrying segment 220 is provided with a second protrusion 224 on a first side of the first protrusion 222, and the carrying segments 220 being arranged adjacent to the first carrying segment 220, i.e. carrying segments 220 arranged directly before and after the first carrying segment 220, are provided with a second protrusion 224 on the opposite side of the first protrusion 222. Due to the asymmetry of the carrying element 220, according to above, this may obtained by simply rotating carrying elements 220 180 degrees around a vertical axis, in relation to each other.

In another embodiment, the switches 240a, 240b may have a protrusive track, and the engaging means 224 of the carrying segment 220 may be a complementary recess.

Each one of the switches 240a, 240b is maneuverable such that upon activation, the angle of the grooves 242 may be changed within the plane defined by the upper surface 202 of the frame 201. Further, the slat conveyor 20 comprises a control system 250 for controlling the switches 240a, 240b, and including a sensor 252 for detecting the presence and/or absence of objects being transported towards the central portion 234 of the groove 232 of the guiding path 230.

On the lower side of the frame 201, a second guiding path is provided for merging the carrying segments 220 into a single route. Thus, when the carrying segments 220 are reaching the upper surface 202, they will all be guided in a single direction by means of the guiding path 230.

The functionality of the slat conveyor 20 will now be described with reference to FIGS. 1 to 4. A feeding mechanism (not shown) is continuously supplying objects to a first conveyor 10. The objects may for example be food packages, beverage containers, bags of any content, or other objects having limited physical dimensions. When being transported on the first conveyor 10, the objects are aligned along a single direction such that a train of objects is formed. When reaching the end of the first conveyor 10, i.e. the outlet 14, the objects will be transferred to the slat conveyor 20 via the inlet 22. Hence, the moving carrying segments 220 will engage with the objects and carry these along the slat conveyor 20. Preferably, the carrying segments 220 have a narrow width, i.e. the distance between the slats 210 is small, such that an object being transported by the slat conveyor 20 is lying on a plurality of subsequent carrying segments 220. The speed of the slat conveyor 20 is preferably synchronized with the speed of the first conveyor 10, such that objects are transferred between the first conveyor 10 and the slat conveyor 20 without any interruptions.

When an object is entering the slat conveyor 20, the sensor 252 detects the presence of the particular object. The sensor 252 transmits a signal to the control means 250, which then determines if the particular object should be directed to the left conveying route or the right conveying route. Such decision may be made according to different requirements; e.g., every second object should be directed to the right, and every second object should be directed to the left. In another situation a specific number of objects should be guided in one direction, and following this a following number of objects should be guided in the other direction. When a decision is made that the present object should be directed along a specific route, the control means 250 checks which one of the switches 240a, 240b that is currently guiding a carrying segment 220. That is, since only every second carrying segment 220 has a second protrusion 224 that may be guided by a particular switch, while every other second carrying segment 220 has a second protrusion 224 that is guided by the opposite switch, the control means is configured to activate, or turn, a switch not currently guiding a carrying segment 220. For this purpose, the control means 250 may be connected to an inductive sensor, sensing a magnetic field due to the presence of a second protrusion 224. In another embodiment, the control means 250 may be connected to an optical sensor detecting the presence of the second protrusion 224. Hence, the control means 250 then sends a signal to the switch 240a, or 240b, not currently guiding a carrying segment 220 thus forcing the switch 240a or 240b to change its position such that the second protrusion 224 of the next coming carrying segment 220 is guided by the groove 242 of the switch. Upon this, the first protrusion 222 arranged at the center of the carrying segment 220 is allowed to be displaced within the enlarged central portion 234 of the groove 232. In a next step, the control means 250 further sends a signal to the opposite switch, such that this switch also activates, or turns, in the same direction. This step is performed during the time the opposite switch is guiding a carrying segment 220, such that the next carrying segment 220, having a second protrusion at the same side as the switch to be activated, will be guided by the activated switch.

Once both switches have been activated, they will remain in this position until the sensor 252 detects that the object has passed the central portion 234 of the groove 232. Upon this, the control means 250 determines which switch to turn by checking which switch not being occupied by a second protrusion 224. Upon this, the free switch is activated, and the opposite switch is consequently activated when it is no longer activated by a second protrusion 224.

In another embodiment, the switches 240a, 240b are kept in the position until the sensor 252 detects a new object, i.e. switching occurs upon presence of an object instead of upon absence of an object.

In a yet further embodiment, the slat conveyor 20 may be configured to divide a single conveying route into three, four, or even more different conveying routes. In such embodiment, a multiple of switches are implemented, each maneuverable into multiple positions for guiding the carrying segments into the desired conveying route.

In another embodiment, the slat conveyor 20 may comprise a larger number of switches, while still dividing a single conveying route into two different conveying routes. In such embodiment, the switches have a second engaging member arranged at different distances from the first engaging member. Hence, the operational speed of the switches may be further decreased for further improving the conveying capacity of the slat conveyor.

The sensor 252 may be excluded from the slat conveyor 20 if the first conveyor 10 is supplying objects in an even and continuous flow. Hence, the switches 240a, 240b may be programmed to move at specific time intervals, instead of being operated by means of sensor input.

In a yet further embodiment, the slat conveyor 20 comprises a driving means connected to a plurality of slats 210 and configured to move the plurality of slats 210 in a closed loop along a conveying surface 202, a first end surface 204, a return surface, and a second end surface 205. The slat conveyor further comprises a first guiding means 230 being fixedly arranged on said conveying surface 202 and having a groove 230 extending in a conveying direction along said conveying surface 202, and a plurality of carrying segments 220, each of which segments 220 is arranged in a space formed between two adjacent slats 220, and is moveable along said slats 220. Each segment 220 comprises a first protrusion 222 adopted to be guided by said groove 230, every second segment 220 comprises a second protrusion 224 arranged on one side of the first protrusion 222, and every other second segment 220 comprises a second protrusion 224 arranged on an opposite side of the first protrusion 222, wherein the slat conveyor further comprises a second guiding means comprising at least two individually controlled switches 240a, 240b arranged on opposite sides of the groove 230, wherein each switch 240a, 240b is arranged to receive the second protrusion 224 of the carrying segment 220.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way. Further, any reference to "upper", "lower", "right", or "left" are made only as relative determinations. It should thus be realized that such references do not limit the scope of the claims.

The invention claimed is:

1. A slat conveyor, comprising:
a plurality of carrying segments, wherein each of the plurality of carrying segment includes a first side for receiving objects, a second side, the first and second sides being positioned on opposite sides of a first plane, and at least a third side and a fourth side each intersecting an end of the first side and an end of the second side, the third and the fourth sides being positioned on opposite sides of a second plane perpendicular to the first plane,
a first guide configured to guide the plurality of carrying segments from a single conveying route, via a switching area, to at least two different conveying routes along a conveying surface of the slat conveyor,
a second guide comprising at least two individually controlled switches arranged on opposite sides of the switching area,
a first engaging member arranged on the second side and configured to be guided by the first guide of the slat conveyor,
a second engaging member arranged on the second side on one side of the first engaging member and configured to be guided by the second guide of the slat conveyor, and
wherein the first switch is arranged to guide the second engaging member of one of the plurality of carrying segments arranged on a first side of the first engaging member, and the second switch is arranged to guide a second engaging member of a subsequent one of the plurality of carrying segments arranged on an opposite side of the first engaging member, and
wherein each of the plurality of carrying segments is asymmetric around a vertical plane through the first engaging member.

2. The slat conveyor according to claim 1, wherein the first engaging member and the second engaging member are arranged symmetrically such that, if one of the plurality of carrying segments is rotated 180° horizontally, the second engaging member is configured to be guided by a second switch of the slat conveyor.

3. The slat conveyor according to claim 1, wherein the first engaging member is a protrusion.

4. The slat conveyor according to claim 1, wherein the second engaging member is a protrusion.

5. The slat conveyor according to claim 1, wherein the first switch and the second switch do not receive a second engaging member when the carrying segment is positioned in the switching area.

6. The slat conveyor according to claim 1, wherein the first switch and the second switch are controlled by electromagnetic actuators.

7. The slat conveyor according to claim 1, wherein the first switch and the second switch are controlled by pneumatic cylinders.

8. The slat conveyor according to claim 1, further comprising a sensor for detecting the presence and/or absence of an object, wherein the sensor is connected to the first switch and the second switch by means of a control means.

9. The slat conveyor according to claim 1, further comprising means for detecting the location of the second engaging member of a particular carrying segment, wherein the slats are alternately staggered in their longitudinal direction and wherein the means further comprises a sensor for detecting the projecting ends of the slats.

10. The slat conveyor according to claim 1, further comprising control means for moving the first switch and the second switch, wherein the first switch is moved when it receives a signal from the control means, and wherein the second switch is automatically moved after a predetermined time.

11. The slat conveyor according to claim 1, wherein the first guide includes a groove, and the at least two individually controlled switches of the second guide each include a respective groove,
the first engaging member of one of the plurality of carrying segments engages the groove of the first guide,
the second engaging member of one of the plurality of carrying segments engages the groove of one of the at least two individually controlled switches, and
the second engaging member of the subsequent one of the plurality of carrying segments engages the groove of the other of the at least two individually controlled switches.

12. The slat conveyor according to claim 1, wherein the first guide includes a groove that receives the first engaging member of each successive carrying segment, the groove extending to the switching area at which the groove divides into two separate grooves.

* * * * *